(12) United States Patent
Brubaker

(10) Patent No.: US 11,006,639 B2
(45) Date of Patent: May 18, 2021

(54) POULTRY EUTHANIZING SYSTEM

(71) Applicant: Chad Brubaker, Olar, SC (US)

(72) Inventor: Chad Brubaker, Olar, SC (US)

( * ) Notice: Subject to any disclaimer, the term of this patent is extended or adjusted under 35 U.S.C. 154(b) by 0 days.

(21) Appl. No.: 16/744,825

(22) Filed: Jan. 16, 2020

(65) Prior Publication Data
US 2020/0229452 A1 Jul. 23, 2020

Related U.S. Application Data

(60) Provisional application No. 62/795,881, filed on Jan. 23, 2019.

(51) Int. Cl.
*A22B 3/00* (2006.01)

(52) U.S. Cl.
CPC .................... *A22B 3/005* (2013.01)

(58) Field of Classification Search
CPC .................. A22B 3/00; A22B 3/005
USPC ...................................... 452/57, 66
See application file for complete search history.

(56) References Cited

U.S. PATENT DOCUMENTS

| | | | | |
|---|---|---|---|---|
| 3,548,447 A | * | 12/1970 | Price, Jr. | A22B 3/005 452/52 |
| 5,112,270 A | * | 5/1992 | Howard | A22B 3/02 452/57 |
| 7,435,166 B2 | | 10/2008 | Benson et al. | |
| 7,448,943 B1 | | 11/2008 | Woodford et al. | |
| 7,717,773 B2 | | 5/2010 | Woodford et al. | |
| 8,056,759 B2 | | 11/2011 | Spence | |
| 8,216,031 B2 | | 7/2012 | Kleinsasser | |
| 8,932,117 B1 | | 1/2015 | Keck et al. | |
| 9,107,423 B1 | | 8/2015 | Moyle | |
| 9,192,170 B2 | | 11/2015 | Darling et al. | |
| 10,015,973 B2 | | 7/2018 | Darling et al. | |
| 2008/0254727 A1 | * | 10/2008 | Lang | A22B 3/086 452/66 |
| 2017/0231237 A1 | * | 8/2017 | Cheek | A22B 3/005 452/66 |

* cited by examiner

*Primary Examiner* — Richard T Price, Jr.
(74) *Attorney, Agent, or Firm* — Michael A. Mann; Nexsen Pruet, LLC

(57) ABSTRACT

Disclosed herein is a system including a portable device for euthanizing sick or infirm poultry. The device includes a chamber with a lid and a canister of compressed carbon dioxide that communicates with the interior of the chamber, and controls that include opening and closing the chamber's lid with a pneumatic cylinder, driven by the same source of compressed carbon dioxide used to euthanize the poultry. A sick or infirm bird in place in the chamber and with the chamber on its shelf on the frame of the present system and the start button on the controls is pressed. The lid is automatically closed by pressing the start button, whereupon the interior of the chamber fills with carbon dioxide and a timer is started so that, after approximately one minute, the lid opens so the dead bird may be removed from the flock.

10 Claims, 5 Drawing Sheets

POULTRY EUTHANIZING SYSTEM

TECHNOLOGY FIELD

The present disclosure relates to a device for euthanizing sick or infirm poultry.

BACKGROUND

Raising poultry as a source of diet protein is a major, worldwide, industry and poultry growers make a significant contribution to the diet of people around the world. Poultry is mostly raised in large buildings where the poultry is protected from predators and the elements, and where the birds are fed, watered, warm and healthy.

Inevitably, some of the birds do not survive to maturity. Culling the dead and sick or infirm birds from the balance of the flock is a significant task in proper poultry husbandry. Disease can spread easily to other birds in an enclosed flock. Accordingly, timely removal of sick or infirm and dead birds is essential to preservation of overall health of the flock.

To identify and remove sick or infirm or dead birds, poultry farmers walk through the flock and look for birds that need to be removed. Modern poultry houses may be hundreds of feet long. Even when the flock mortality is low, there will inevitably be several birds that need to be picked up and removed.

Sick or infirm birds need to be euthanized and removed as quickly as possible. Sick or infirm birds may be suffering. The conventional, and effective, method of ending a bird's life is by manually dislocating the cervics. The dead bird is carried from the house. A better way to euthanize the sick or infirm birds in a large flock would be an advantage.

SUMMARY

According to its major aspects and briefly recited, the presently disclosed device is a portable euthanizing device for poultry. The device includes a control system operable to regulate delivery of a euthanizing gas, namely, from a tank of compressed carbon dioxide, to said interior of said chamber through tubing that leads to a chamber with a lid. The tank communicates via a hose with the chamber and also supplies gas under pressure to a solenoid valve that operates the lid. The use of the compressed gas is regulated by a processor to operate valves according to a sequence so that the delivery of the gas is effective in safely achieving the objective of the present system.

An alternative aspect of the present system is to use a trolley and bin system that runs the length of the poultry house on a rail and carries the compressed carbon dioxide and the dead birds as the poultry farmer walks the flock with the chamber, with a hose that runs from the gas tank to the chamber carried by the trolley.

The use of carbon dioxide to suffocate the sick or injured bird and to also operate the lid is a feature of the invention. Moreover, carbon dioxide, unlike other gases can be freely released from the chamber when the lid is opened. Compressed carbon dioxide is readily available and inexpensive.

These and other features and their advantages will be apparent to those skilled in poultry husbandry from a careful reading of the detailed description accompanied by the drawings.

BRIEF DESCRIPTION OF THE DRAWINGS

In the figures.

DETAILED DESCRIPTION

Figure 1:
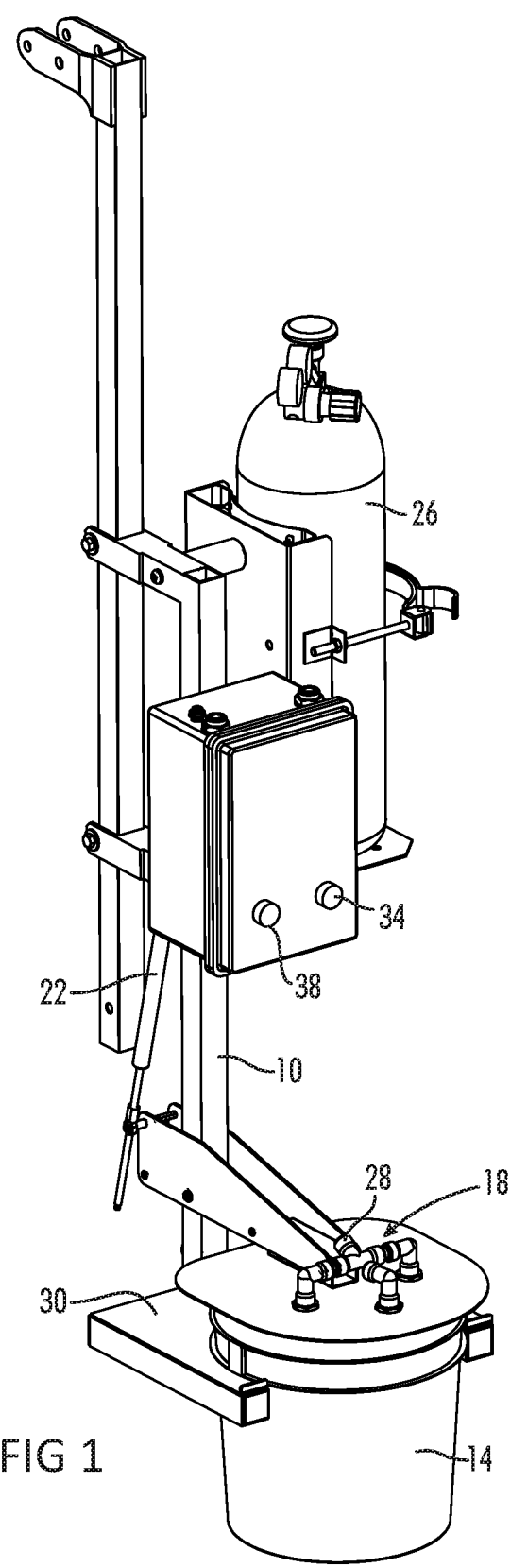
FIG. 1 is a left perspective view of the present poultry euthanizing system, according to an aspect of the disclosure.
Figure 2:
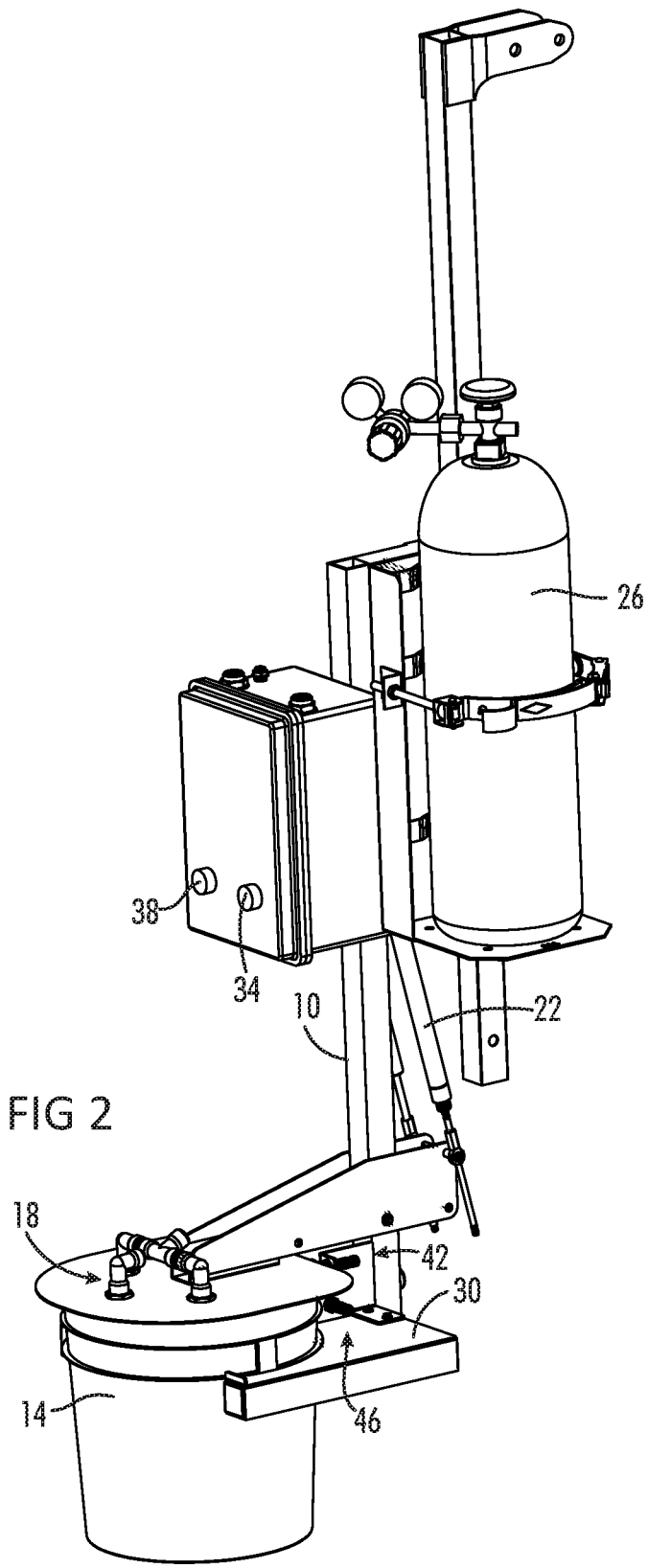
FIG. 2 is a right perspective view of the present poultry euthanizing system, according to an aspect of the disclosure.

Referring now to FIGS. 1 and 2, the present device includes a frame 10 that holds a chamber 14 with an interior dimensioned to receive a bird such as a bird of the type raised for food, such as chickens. Chamber 14 has a lid 18 that is closed by a pneumatic cylinder 22 against a spring (not shown) and, when closed, lid 18 is operable to seal chamber 14. Chamber 14 is placed on frame 10 together with a compressed gas canister 26. Pneumatic cylinder 22 receives compressed gas from gas canister 26 to close lid 18 and to fill chamber 14. The compressed gas from gas canister 26 is regulated by valves.

Gas canister 26 holds compressed carbon dioxide that serves as the compressed gas for enabling pneumatic cylinder 22 to close lid 18. It also supplies compressed carbon dioxide for euthanizing the bird in the interior of chamber 14. The dual use of the gas in gas canister 26 for the operation of lid 18 and for euthanizing a bird in the chamber 14 is a feature of the present system. The choice of carbon dioxide is another feature as it is effective for both purposes and, when lid 18 is opened, the carbon dioxide may be freely released without harm to the other birds in the flock or the operator of the present device. Carbon dioxide, and also compressed carbon dioxide, is readily available and relatively inexpensive.

Chamber 14 is secured to frame 10 by a shelf 30. Hoses, not shown in FIGS. 1 and 2, lead from gas canister 26 to pneumatic cylinder 22 and to the chamber 14 where they are attached to lid 18 using typical gas fittings 28.

Figure 3:
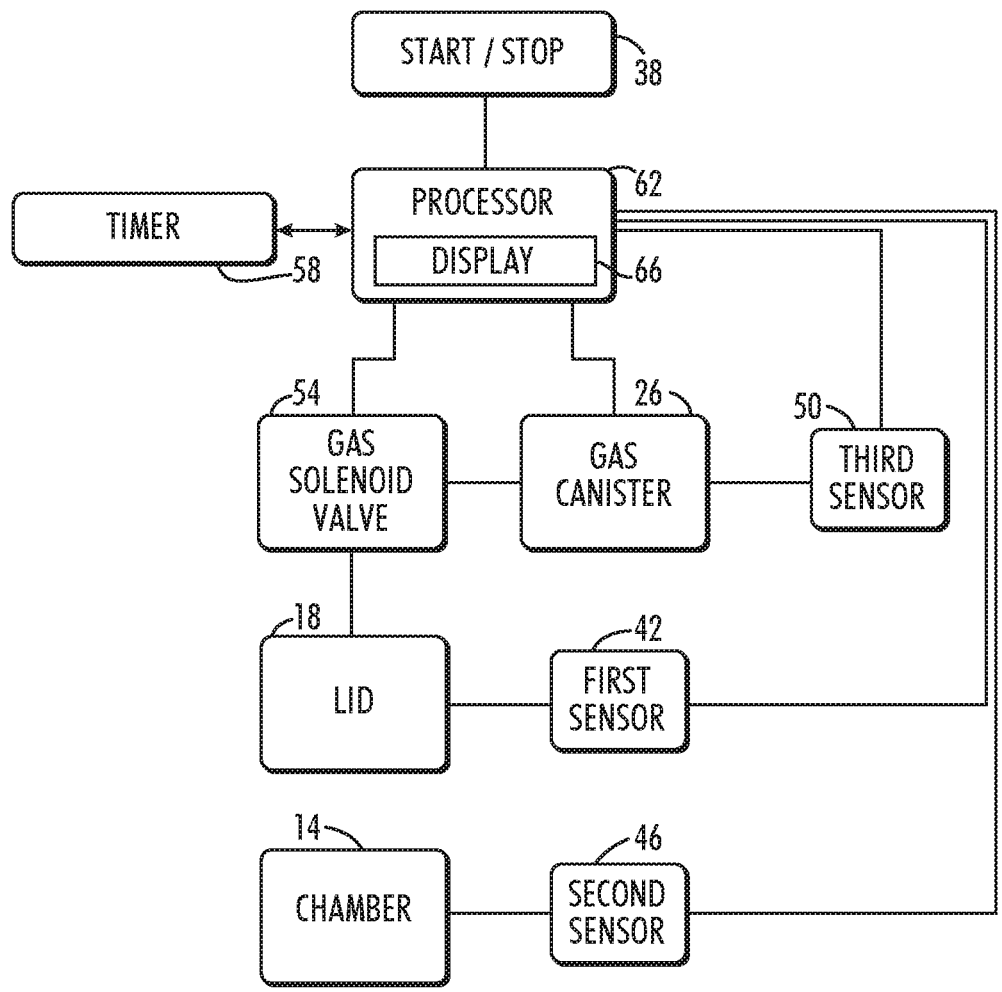
FIG. 3 is a schematic diagram of the present poultry euthanizing system, according to an aspect of the disclosure.
Figure 4:
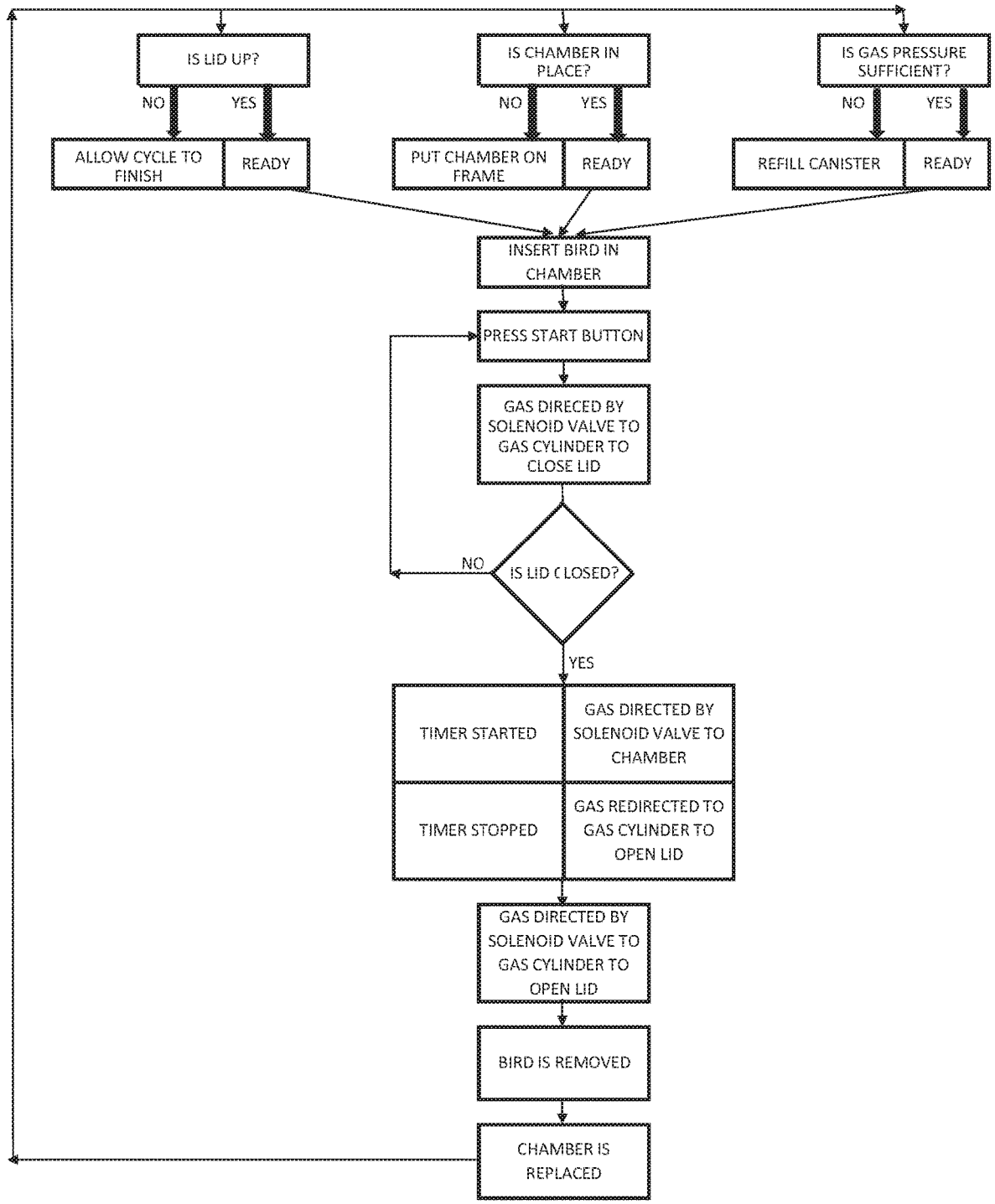
FIG. 4 is a flow diagram of the present poultry euthanizing system, according to an aspect of the disclosure.

The major components of the system is shown in a simplified schematic diagram in FIG. 3 and their interaction described in logic diagram in FIG. 4. A processor 62 that includes a timer 58 is in electrical connection with a gas solenoid valve 54 that closes lid 18 in response to electrical signals, using gas from gas canister 26.

FIG. 4 shows the sequence of steps in the process. The user initiates the process by placing a bird in chamber 14 and then pressing a start/stop button 38 once. An indicator lamp will light to indicate to the user that the system has electrical power and has started its sequence.

The present system has three sensors. As illustrated in FIG. 3, there is a first sensor 42, located on frame 10 that detects when lid 18 of chamber 14 is closed. A second sensor 46, also carried on frame 10, detects the presence of chamber 14 in correct position on frame 10. A third sensor 50 is a gas pressure sensor, or manometer, that determines whether the pressure of the gas in the gas canister 26 is sufficient for a cycle of use. Display 66 shows the system conditions from first sensor 42, second sensor 46 and third sensor 50.

A cycle of use begins when the user places a bird into chamber 14 and presses the start/stop button 38. Chamber 14 is movable for convenience in carrying sick or infirm birds but must be in position on frame 10 for the process to proceed. If on pressing start/stop button 38, three conditions are met: lid 18 is up, chamber 14 is present on shelf 30 of frame 10, and gas pressure in gas canister 26 is sufficient, the system will then direct gas from the gas canister 26 through a hose to pneumatic cylinder 22, which urges lid 18 to close. If lid 18 fails to close, the user may press start/stop button 38 again.

When lid is down, as recognized by first sensor 42, gas will then be directed into chamber 14 from gas canister 26 and timer 58 will be set. After approximately one minute, lid 18 will open and the dead bird may be removed to make room for another ill or infirm chicken.

If chamber 14 is in position, its lid 14 is up, and gas pressure in gas canister 26 is sufficient, then gas solenoid valve 54 directs a flow of gas from gas canister 26 to pneumatic cylinder 22 that operates lid 18 to move lid 18 from its open position to its closed position.

Once lid 18 is down, as confirmed by the first sensor 42, then a timer 58 is started and set to run a preselected time interval while gas solenoid valve 54 redirects compressed gas from pneumatic cylinder 22 to the interior of the chamber 14.

After the preselected time interval has elapsed, gas solenoid valve 54 stops the flow of gas into the interior of chamber 14 and to pneumatic cylinder 22. A spring (not shown) returns lid 18 to the open position. The bird is then removed from chamber 14 for disposal. The preselected time interval is sufficient to stun the bird on the initial entrance of the compressed carbon dioxide and result in its suffocation within a minute.

Processor 62 directs the action of gas solenoid valve 54 in controlling the sequence of the operation. Display 66 may present the gas pressure, the elapsed time from the start of the gas delivery to chamber 14, and the total number of cycles of operation.

The operator then removes the bird from chamber 14 in preparation for another cycle.

Figure 5:
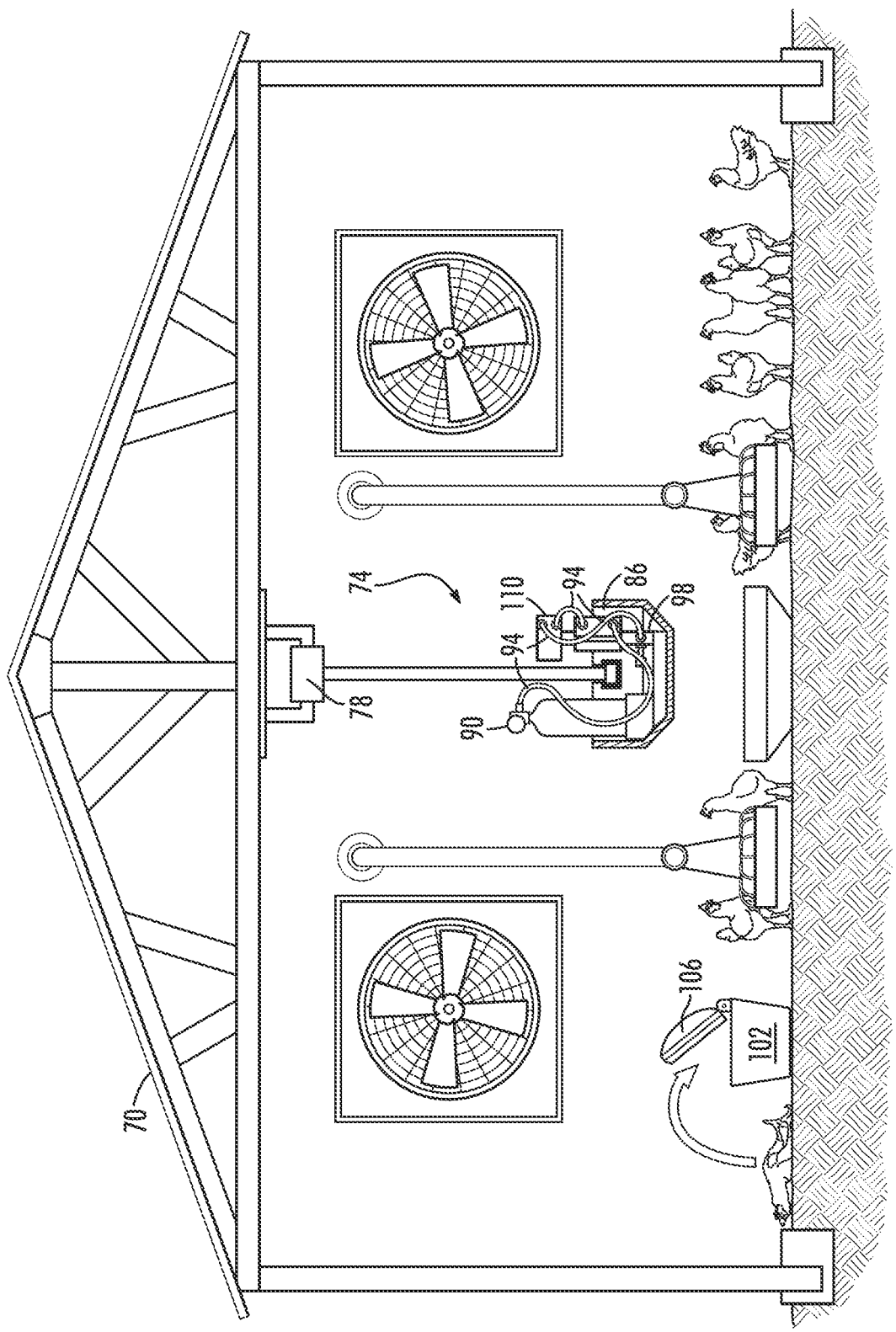
FIG. 5 is an illustration of an embodiment of the present poultry euthanizing system, according to an aspect of the disclosure.

In an aspect of the disclosure as illustrated in FIG. 5 a poultry house 70 may be equipped with a trolley 74 that moves along a rail 78 running the length of the poultry house 70. A bin 86 may be included with the trolley 74 that can hold the dead birds and the present device. Chamber 102, being removable, can be carried into the flock by the operator to recover the sick or injured birds and then return with a bird in chamber 102 to the frame 98 and place chamber 102 on the shelf of frame 98, to begin another cycle of delivering compressed gas 90 via hose 94 as controlled by process 110.

Those skilled in the art of poultry husbandry will appreciate that many modifications and additions may be made in the foregoing description without departing from the spirit and scope of the present specification.

What is claimed is:

1. A system for use in a building having a rail, comprising:
   a trolley movable on said rail;
   a bin supported by said trolley;
   a frame;
   a chamber carried by said frame and having an interior and an opening;
   a lid carried by said chamber and operable to pivot with respect to said opening of said chamber between an open position, wherein said interior of said chamber is accessible, and a closed position, wherein said interior of said chamber is sealed by said lid;
   a supply of a compressed euthanizing gas for euthanizing poultry;
   tubing connecting said supply of euthanizing gas to said interior of said chamber;
   a control system operable to regulate delivery of euthanizing gas from said supply to said interior of said chamber through said tubing.

2. The system of claim 1, wherein said gas is carbon dioxide.

3. The system of claim 1, further comprising a pneumatic cylinder attached to said lid, said pneumatic cylinder moving said lid between said open position and said closed position.

4. The system of claim 1, wherein said gas is compressed carbon dioxide and wherein said system further comprises a pneumatic cylinder attached to said lid and in fluid communication with said compressed carbon dioxide and the interior of said chamber, said pneumatic cylinder moving said lid between said open position and said closed position.

5. The system of claim 1, wherein said control system further comprises a status indicator of to indicate whether said lid is in said closed position or said open position.

6. The system of claim 1, wherein said control system further comprises a gas control valve.

7. The system of claim 1, wherein said control system uses said compressed gas to open and close said lid and to euthanize poultry in said chamber.

8. The system of claim 1, wherein said system further comprises:
   a gas canister containing compressed gas carried by said trolley;
   a frame;
   a chamber attached to said frame, said chamber having an interior and a lid movable between an open position and a closed position;
   a tube running from said interior of said chamber to said gas canister carried by said trolley; and
   a control system operable to regulate delivery of said gas from said gas canister to said interior of said chamber through said tubing.

9. The system of claim 8, wherein said gas is selected from gases effective for euthanizing poultry.

10. The system of claim 8, further comprising:
    a gas spring operative to move said lid to said open position from said closed position; and
    a gas valve operable to direct gas to said pneumatic cylinder to move said lid to said closed position.

* * * * *